(12) United States Patent
Yagawa

(10) Patent No.: US 7,334,079 B2
(45) Date of Patent: Feb. 19, 2008

(54) WORM PROVIDING STORAGE SYSTEM

(75) Inventor: Yuichi Yagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/648,357

(22) Filed: Dec. 28, 2006

(65) Prior Publication Data

US 2007/0113118 A1    May 17, 2007

Related U.S. Application Data

(63) Continuation of application No. 10/808,792, filed on Mar. 24, 2004, now Pat. No. 7,171,511.

(51) Int. Cl.
*G06F 12/00* (2006.01)

(52) U.S. Cl. ................ 711/100; 711/102; 711/103; 711/163

(58) Field of Classification Search ............... None
See application file for complete search history.

*Primary Examiner*—Jasmine Song
(74) *Attorney, Agent, or Firm*—Townsend and Towensnd and Crew LLP

(57) ABSTRACT

A method for operating a storage system configured to provide a Write Once and Read Many (WORM) function includes receiving a first command at a storage subsystem from a host. At least a portion of the first command is stored on a WORM storage device coupled to the storage subsystem. A second command is received at the storage subsystem. The second command is examined using a command filter, the filter being provided with a predetermined rule for filtering selected types of commands. At least a portion of the second command is stored if the second command satisfies the predetermined rule. The WORM storage device is used to verify the WORM function of the storage system.

10 Claims, 6 Drawing Sheets

FIG. 4

| Serial Number | Command Execution Time | CDB |
|---|---|---|
| 1 | 2003/1/3 11:30 '30 | 04h.xxh.xxh.xxh.xxh.xxh. |
| 2 | 2003/1/3 11:30 '32 | 0Ah.xxh.xxh.xxh.xxh.xxh. |
| --- | --- | --- |
| n | 2003/1/3 12:30 '00 | 0Ah.xxh.xxh.xxh.xxh.xxh. |
| --- | --- | --- |

FIG. 6

| | Block / LU | 0 | 1 | 2 | 3 | --- | |
|---|---|---|---|---|---|---|---|
| | 0 | 01 | 01 | 11 | 11 | --- | |
| | 1 | 00 | 00 | 00 | 00 | --- | |
| | --- | --- | --- | --- | --- | --- | |

WORM PROVIDING STORAGE SYSTEM

CROSS-REFERENCES TO RELATED APPLICATIONS

The present application is a Continuation Application of U.S. application Ser. No. 10/808,792, filed Mar. 24, 2004, now U.S. Pat. No. 7,171,511 which is incorporated by reference herein in its entirety for all purposes.

BACKGROUND OF THE INVENTION

The present invention relates to a storage system, in particular to a storage system configured to provide a reliable data archiving capability.

Data archival is the act of saving a specific version of a data set (e.g., for record retention purposes) for an extended period of time. The data set is stored in archive storage pursuant to command by a user or data processing administrator. Archived data sets are often preserved for legal purposes or for other reasons of importance to the data processing enterprise. Accordingly, it should be possible to verify that the archived data have not be altered, tempered, or rewritten once the data have been written. One method for providing data verification or certification is to use Write Once and Read Many (WORM) techniques.

As the term suggest, the WORM technique enables data to be written only once to the storage medium, e.g., optical storage device or WORM discs. Such WORM discs generally can be written only once because the medium is physically and permanently modified by the process of writing data thereto, e.g., by using a high power laser beam to form small pits which alter the reflectance of the surface of the medium. The read process can then retrieve the stored information many times thereafter by beaming a low power beam on the medium and detecting the reflectance of the low power beam.

The WORM technique has gained more importance recently with the new government regulations requiring companies to preserver certain business records in a non-rewritable, non-erasable format. For example, U.S. Securities and Exchange Commission has recently required stock brokers to preserve records of communications with their customers in a non-rewritable, non-erasable format under the Securities Exchange Act of 1934 Rule 17a-4. The National Association of Securities Dealers Inc. (NASD) has implemented similar regulations in Rule 3010 & 3110. These communications include emails, instant messages and voice messages, and constitute a tremendous amount of data.

One method of providing WORM storage procedure is to use File System's change mode functions like "chmod" in UNIX, which designates certain files as being non-rewritable. However, this method does not provide sufficient trusts to auditor since it is based on generally available software. The method also requires a significant administrative burden to users, such as changing modes to each file.

Alternatively, WORM storage devices, e.g., CD-ROM and DVD-ROM, may be used. However, these WORM devices generally do not provide high speed write operations. If they are used to archive the required communications between the customers and the business, a significant performance delay would result.

Yet another method would be to use a disc array storage unit that are provided with internal WORM capabilities. Such a storage unit may be provided with micro-programs inside their controller with a WORM capability. This method would use a specific software program that users can not access in order to provide more trust to the auditors. However, this method would require high development costs.

Accordingly, it would be desirable to provide a WORM archiving system that provides a high degree of trust, ease of management, limited performance impacts, and low implementation cost, particularly a system that enables a WORM verification or proving feature.

BRIEF SUMMARY OF THE INVENTION

In one embodiment, a storage system includes a command filter that filters selected commands based on predefined rules from IO requests. The filtered commands are written on a WORM device. Data associated with the filtered commands, if exists, are not stored in the WORM device to minimize performance impact on the storage system. Each command recorded on the WORM device is provided with a serial number and a timestamp. A command checker checks to determine if the storage system or specific area thereof has maintained WORM integrity.

In one embodiment, a method for operating a storage system configured to provide a Write Once and Read Many (WORM) function includes receiving a first command at a storage subsystem from a host. At least a portion of the first command is stored on a WORM storage device coupled to the storage subsystem. The WORM storage device is used to verify the WORM function of the storage system. A second command is received at the storage subsystem. The second command is examined using a command filter, the filter being provided with a predetermined rule for filtering selected types of commands. At least a portion of the second command is stored if the second command satisfies the predetermined rule.

In one embodiment, a method for providing a data archival function includes storing at least portions of commands directed to a storage subsystem in a Write Once and Read Many (WORM) storage device, the commands being of a type that affects a content of data stored in a storage area of the storage subsystem; and associating a serial number to each of the commands, the serial number being useful for sorting the commands in a given order, wherein the WORM storage device includes a plurality of command records, the command records including the at least portions of the commands and the serial numbers, wherein the command records are useful for verifying whether or not a storage subsystem has maintain a WORM integrity.

In another embodiment, a method for auditing a storage system includes sorting a plurality of records stored in a Write Once and Read Many (WORM) storage device using serial numbers associated with the records, each record including information on a command sent to a storage subsystem; examining the information on the command for one of the records to retrieve address of a storage area to which the command was directed; obtaining an entry associated with the storage area from a bitmap of a plurality of storage areas of the storage subsystem; and determining whether or not there is an indication of a WORM violation using the obtained entry.

In another embodiment, an archival system includes a controller to handle data requests from a host computer, each data request including a command; a command filter to select commands that satisfy a predetermined filtering rule; a Write Once and Read Many (WORM) storage device to store at least portions of the commands that have been selected by the command filter; and at least one storage area that has been defined as a WORM storage area for archiving data.

In yet another embodiment, a computer readable medium includes a computer program for verifying an archival function. The computer program includes code for receiving a first command at a storage subsystem from a host; code for examining the first command using a predetermined rule; code for storing at least a portion of the first command on a WORM storage device coupled to the storage subsystem upon determining that the first command satisfies the predetermined rule; code for receiving a second command at the storage subsystem from the host; code for examining the second command using the predetermine rule; and not storing any portion of the second command upon determining that the second command does not satisfy the predetermined rule.

In yet another embodiment, an archival system includes means for handling data requests from a host computer, each data request including a command; means for filtering commands using a predetermine filtering rule to obtain a selected command; means for storing the selected command to a Write Once and Read Many (WORM) storage device; and means for associating a serial number to the selected command that is stored in the WORM storage device.

BRIEF DESCRIPTION OF THE DRAWINGS

FIG. 4 illustrates an exemplary records stored in the command record file of the WORM device according to one embodiment of the present invention.

FIG. 6 illustrates a bitmap table that the command checker module uses to verify whether or not predetermined logical volumes have been maintained as WORM areas.

DETAILED DESCRIPTION OF THE INVENTION

Figure 1:
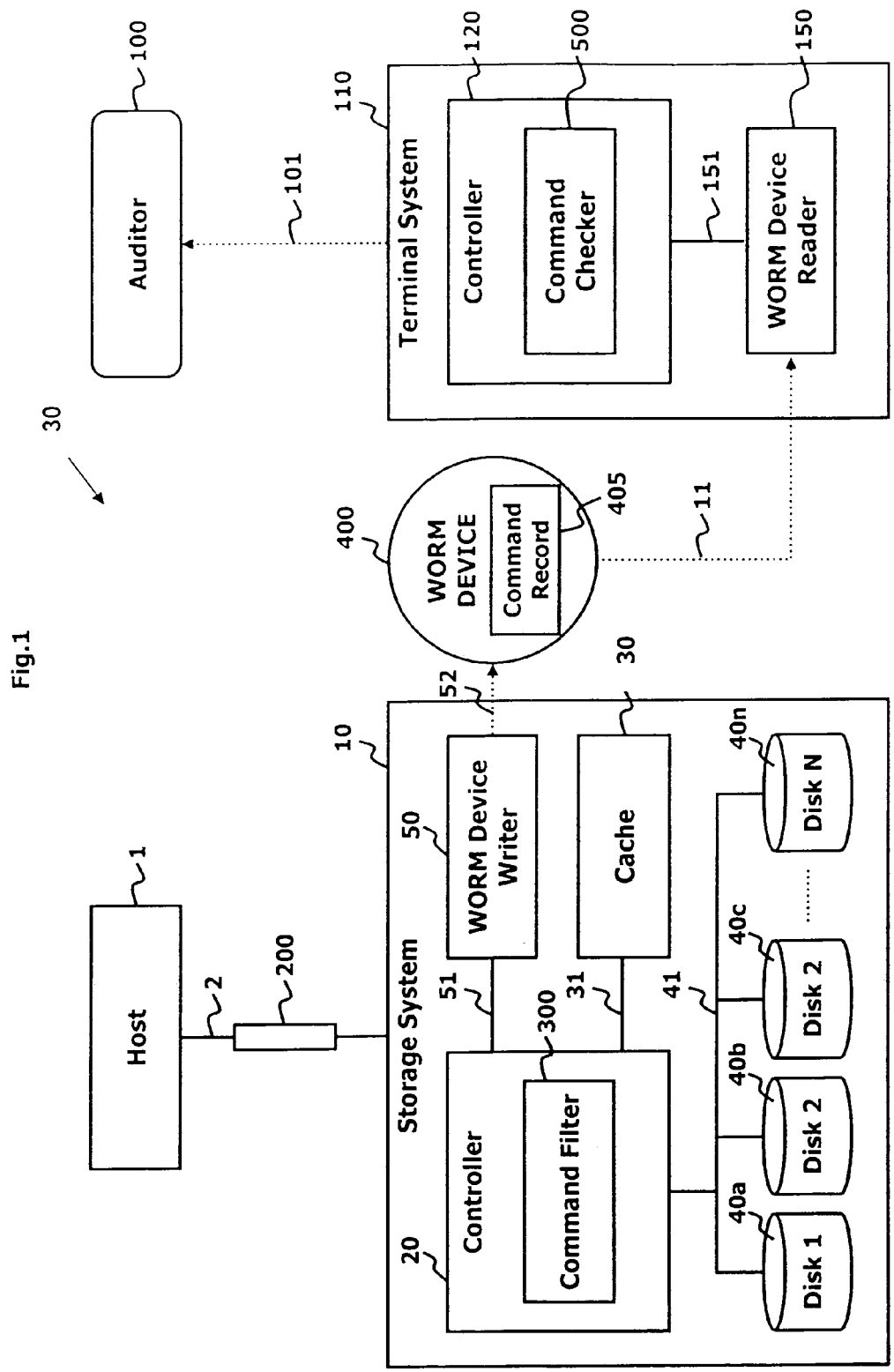
FIG. 1 shows a block diagram of an archival system according to one embodiment of the present invention.

FIG. 1 shows a block diagram of an archival system 30 according to one embodiment of the present invention. The archival system 30 includes a host computer 1, a storage system 10, a WORM device 400, an auditor 100, and a terminal system 110. The storage system 10, WORM device 400, and terminal system 110 together provide WORM proving capability as described below. Although the figure shows only one entry for each component, the number is not limited to only one. For example, the system 30 may include a plurality of storage systems, a plurality of hosts, and a plurality of WORM devices.

Generally, the host computer 1 contains application programs, an operating system and device drivers. The application program generates read/write requests (or IO requests) in cooperation with the operating system and the device drivers. The device driver serves as an interface to the storage system 10 for the host computer 1. The device drivers issue control commands such as SCSI commands to the storage system 10 according to the IO requests.

The host 1 and the storage system 10 are connected by a storage network 2. Examples are FibreChannel, Ethernet, and the like. Also, the architecture of the connection may be DAS (Direct Attached Storage), SAN (Storage Area Network), NAS (Network Attached Storage), OSD (Object Storage Devices), or the like, depending on protocols for the storage network. The IO requests or IOs generally include commands 200. The request may also include data to be written to the storage area if the request is a write request.

The storage system 10 contains a controller 20, cache 30 and a plurality of storage areas 40a-n. In the present embodiment, the storage system is a disk array unit and includes a plurality of storage disks as the storage areas. A more detailed description of the storage system 10 is disclosed in U.S. patent application Ser. No. 10/394,631, entitled "Data Storage Subsystem," filed on Mar. 21, 2003, claiming priority to Japanese Patent Application No. 2002-163705, which is incorporated by reference. The storage system 10 may also be referred to as a storage subsystem, and the archival system 30 may be referred to as a storage system.

In the storage system 10, the controller receives and processes 10 requests from the host 1. For example, when the controller receives a "WRITE" command identifying an appropriate storage address with a certain amount of data, it writes the data to the identified address and returns an appropriate acknowledgement. Similarly, if it receives a "READ" command identifying an appropriate storage address, it reads the data from the identified address and transmits the read data to the host 1. If the storage system 10 provides logical addresses to the host 1 as an interface, the controller 20 executes physical and logical mapping. Also, if the storage system 10 utilizes a RAID architecture, the controller 20 processes data control programs that are required by the RAID system, such as mirroring, stripping, parity processing and so on.

The cache 30 works as a data memory or work memory to improve overall system performance. Generally, the cache is a volatile memory that provides a high access speed. The disks 40a-n stores data as required by the host 1.

Data paths or lines 31, 41, and 51 are internal networks for data and control communications. Examples of the internal networks are PCI, FibreChannel and so on. Also, there are several architectures applied to the storage system in the market, such as a bus, a switch, a matrix and so on.

In one embodiment, the storage system is provided with a command filter module 300 and a WORM device writer 50 to perform a WORM auditing function. The module 300 may be provided in the controller or stored externally, e.g., one of the storage areas in the storage system or a non-volatile semiconductor memory device. The controller 20 executes the command filter module 300.

The command filter 300 filters appropriate commands based on predefined rules. For example, it filters specific types of commands or commands that operates to specific logical or physical addresses. It also asks the WORM device writer 10 to write records of each filtered command with a serial number and the time of issuance for the command. These rules are defined or modified by a user through a user interface (not shown) based on the user's compliance policy.

In one embodiment, a WORM storage device 400 is coupled to the storage system 10. The WORM device 400 is portable or removable device that may be easily detached from the storage system 10. Examples of the storage device 400 include CD-ROM and DVD-ROM. The WORM device writer 50 writes the records of filtered commands to a WORM record file 405 provided in the WORM storage device 400.

In another embodiment, the WORM device writer 50 writes subsystem configuration files in the WORM storage device 400 whenever the subsystem configuration is changed. Examples of the subsystem configurations are those that change the size of devices and reallocate devices. Generally, these configuration changes may cause deletion of data from the configured devices. Accordingly, the files are used to verify that data on given devices were not deleted or modified after the initial writing.

In another embodiment, the files are used to identify the physical address when auditing if the logical to physical address mapping is executed in the subsystem. The logical addresses such as LUN (explained later) are sometimes reused if capacity of physical address is bigger than the one of logical address. Therefore, it is necessary to identify the real address that needs to be proved as WORM in this particular implementation.

A data path or line 52 indicates the coupling between the WORM device 400 and the storage system 10, so that the records may be written in the record file 405. A data path or line 11 indicates the coupling of the WORM device 400 to the terminal system 110, so that the records may be audited. The WORM device 400 provides a physical evidence of a WORM function which provides higher comfort level to auditors than merely software solutions.

In one embodiment, one or more buffers (not shown) may be provided in the storage system 10 to improve the write performance to the WORM device. Alternatively or in conjunction, the storage system may write to a plurality of WORM devices in parallel. For example, the storage system 10 is provide with the capability of writing to a plurality of record files 405 in the WORM devices 400, in which the record files 405 are prepared for different resources such as addresses.

In another embodiment, the WORM device writer 50 includes the WORM device 400 internally and sends the records of filtered commands to the terminal system 110 through a network. The network may be a physical data path or wireless connection. In this embodiment, general users are prohibited from erasing or rewriting data in the storage area designated as the WORM device. The microcode inside the storage subsystem does not allow the users to erase or rewrite data in the area. An example of this function is LDEV Guard on Hitachi Freedom Storage™. Accordingly, an actual WORM device (e.g., CD-ROM) is not required.

The terminal system 110 includes a controller 120, a WORM device reader 150, and an internal network 151. The controller 120 and reader 150 communicate with each other via the internal network 151. An example of the network 151 is a SCSI. The terminal system 110 may be implemented on an ordinary personal computer according to the present embodiment. In the present embodiment, the controller 120 is a CPU, and the WORM device reader 150 is a CD-ROM or DVD-ROM drive.

The WORM Device Reader 150 reads the content of the WORM device 400 when the WORM device is inserted into the reader 150 or the data link 11 is otherwise formed. The content that are read are transmitted to the controller 120.

The controller 120 executes a command checker module 500 provided in the terminal system. The module 500 may be provided within the controller or at a external location thereof. The command checker 500 checks if the storage system 10 or specific areas therein have functioned as WORM storage areas by auditing the command record file 405 of the WORM device 400.

The module 500 verifies whether or not a given storage area or WORM areas in the storage system 10 has been written only once and has not been tempered or erased. For example, a WORM area should only be provided with one ERASE or FORMAT command and one WRITE command, generally, after the ERASE/FORMAT command. If the ERASE or FORMAT command is executed for the WORM area after the first WRITE command, such an action would indicate that the original data has been erased or tempered. If another WRITE command is executed for the WORM areas after the first WRITE command, it would indicate that the original data has been rewritten or tempered. Both of the above situations would indicate that the WORM integrity has not been maintained at the storage system 10.

An auditor 100 coupled to the terminal system receives the result of the verification of the module 500. The auditor 100 may be a computer system or a human being that audits the command record file 405 via the command checker 500.

If the auditor 100 is a computer system, the terminal system 110 provides an interface 101 to transmit the results of the verification to the auditor 100. The auditor then analyzes the results including the possible causes for the WORM violation. For example, the auditor may determine the violation time and area and compare the information associated with the log files of the application program and operating system. If the auditor is a human being, the terminal system 110 provides a user interface 101 to the auditor 100. The auditor 100 then analyzes the result. Alternatively, the terminal system may provide a printed report.

Accordingly, the WORM device 400, command record file 405, command checker 500, and others provide an efficient means of verifying whether the storage system 10 has maintained the WORM integrity. Since only the commands rather than the entire data are recorded on the WORM device 400, the storage system 10 may be provided with verifiable WORM capabilities with a minimal performance impact on the storage system. In one embodiment, only selected commands are recorded on the WORM device so that the storage system would be impacted even less.

In one embodiment, the host 1 may include the command filter 300 and the WORM device writer 50. For example, the device driver of the host performs the functions of the command filter 300 and requests the WORM device writer to archive appropriate commands to the WORM device that is coupled to the host rather than to the storage system.

Figure 2:
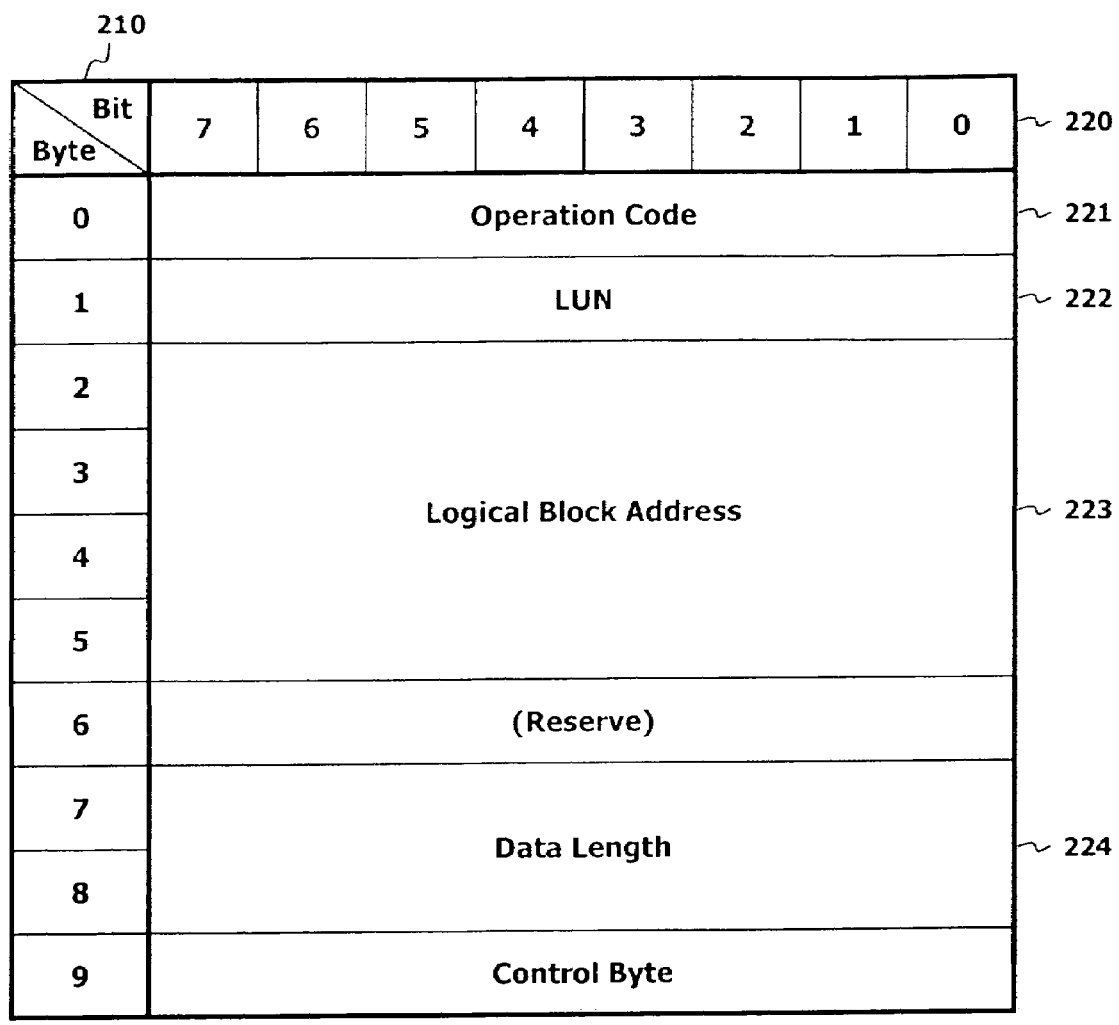
FIG. 2 illustrates an exemplary command according to one embodiment of the present invention.

FIG. 2 illustrates an exemplary command 200 according to one embodiment of the present invention. The command 200 in the present embodiment is a SCSI command being 10 bytes in length. The command 200 is also referred to as a Command Descriptor Block (CDB). A column 210 indicates byte order in the block. A row 220 indicates bit order in each byte. An operation code 221 indicates a particular command to be performed. A logical unit number (LUN) 222 indicates a logical volume (device) in the storage system to which the command is directed. A logical block address (LBA) 223 indicates a block address in the logical volume to where the command is to access. Generally, the logical block address indicates a starting address of the storage area to be accessed in the LUN. A data length 224 indicates the length of data that is associated with the command, thereby providing an ending address of the storage area to be accessed in the LUN.

In one embodiment, the command filter 300 is configured to filter only selected commands according to the predefined rules. For example, the command filter is configured to filter only commands that effect the data written on the designated WORM storage areas, e.g., ERASE, FORMAT, WRITE, and the like. This filtering operation would be performed by checking the operation code 221 of the command 200. The command filter should be overly inclusive to ensure that all commands that may cause WORM violation are in fact filtered and recorded in the command record file 405.

In another embodiment, the command filter 300 is configured to filter all commands directed to selected storage areas or logical volumes that are designated as WORM areas. The WORM area is defined by a user via a user interface. The user specifies a logical address, and the system converts it to a physical address. This filtering operation may be performed by checking the LUN 222 of the command 200. Of course, the granularity of the WORM area is not necessarily limited to a given LUN. For example, a WORM area may be designated by using a SCSI target ID or port ID. It is also possible to designate one or more logical volumes within a SCSI LUN block using a virtual LUN that is mapped to the "real" LUNs. A more detailed description of the virtual LUN is provided in U.S. Pat. No. 6,684,209, which is incorporated by reference.

In another embodiment, all commands or CDBs are recorded to the command record file 405 without filtering. The command checker 500, however, is configured to check only selected commands. This embodiment provides more thorough auditing of the storage system, but at the cost of consuming a greater system resource. Other auditing/filtering procedures including a combination of the above methods may be used according to the needs of the user.

In another embodiment, subsystem configuration commands are also detected and recorded on the command record file 405. The commands may have a different structure than that described in FIG. 2. The commands also may be issue through a control network (out-of-band) other than the storage network 2 (in-band). An Example of the configuration commands is LUN size expansion, which may cause deletion of data on the LUN. Therefore, the commands are used to prove that the data on a given LUN were not deleted or modified after the initial writing.

In another embodiment, the commands are used to identify the physical address during auditing if the logical to physical address mapping are executed in the subsystem. The LUN are reused at times if capacity of physical address is bigger than the one of logical address. Therefore, it is necessary to identify the real address that must be proved as WORM in this particular implementation.

Figure 3:
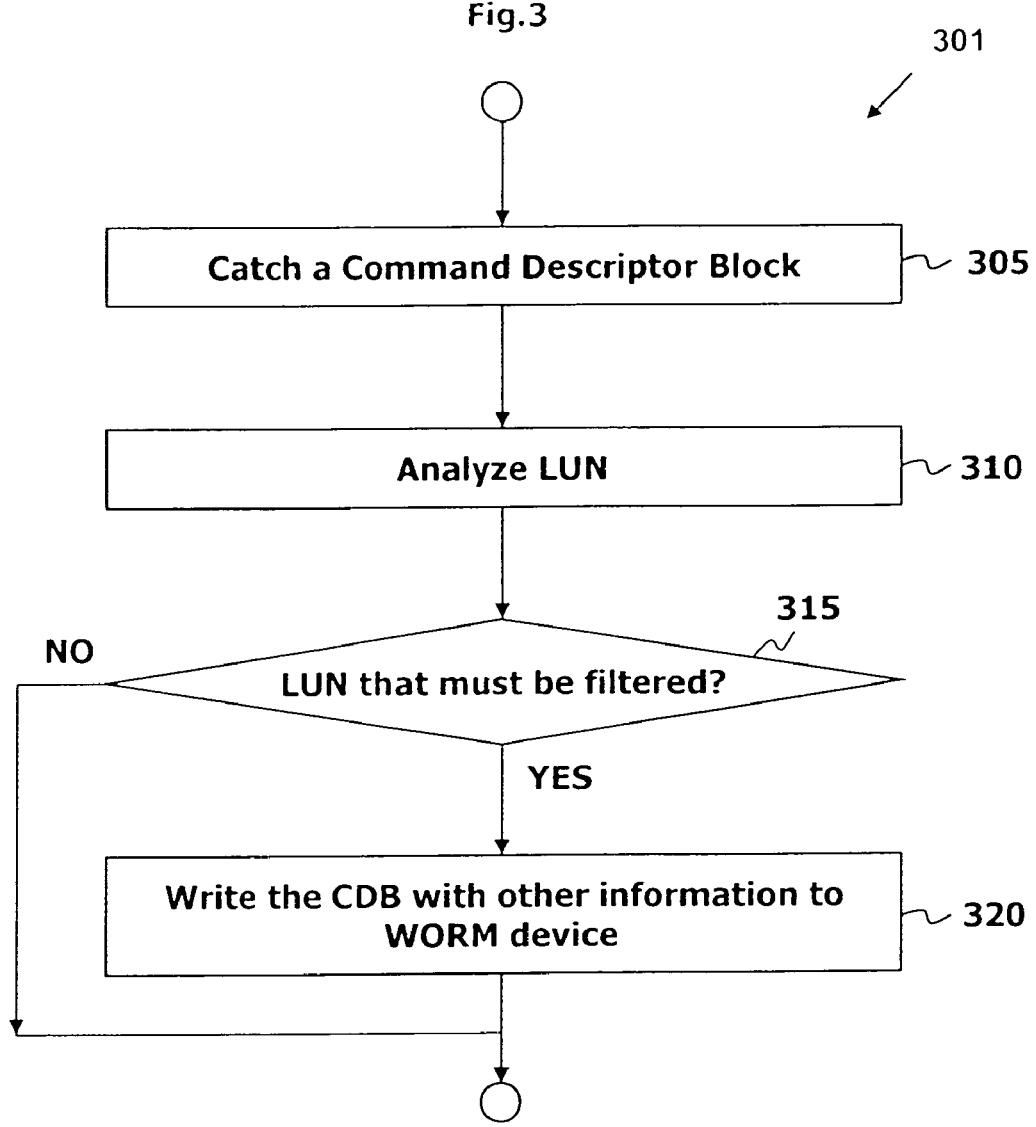
FIG. 3 shows a process performed by the command filter module according to one embodiment of the present invention.

FIG. 3 shows a process 301 performed by the command filter module 300 according to one embodiment of the present invention. In the present embodiment, the module 300 filters the CDBs by checking the LUN 222. Alternatively, the Logical Block Addresses in the command 200 may be used for filtering purposes.

Referring back to the process 301, at step 305, the module 300 extracts a CDB or command 200. Generally, the controller 20 receives all commands or CDBs so this function is generally performed by the controller. The module 300 extracts and examines a LUN 222 of the command 200 (step 310). If the LUN of the command 200 matches one of the predefined LUNs, the module proceeds to step 320 (step 315). Otherwise, the module terminates the process 301 and extracts another CDB.

If the result of step 315 is YES, then the module initiates writing of the CDB to the command record file 405 in the WORM device 400. The writing is actually performed by the WORM device writer 50. In addition to the CDB, information related to the CDB is also written on the record file 405, e.g., serial number and command execution time.

In one embodiment, the serial number refers to a sequential number of the command. The command execution time refers to a timestamp attached to the command, or the time of execution of the command in the storage system 10, or the time of acknowledgement of the command to the host 1. Other useful information for the auditor may also be recorded. In another embodiment, the necessary information for auditing is extracted from the CDB and stored in the command record file 405. Examples of the information are logical or physical addresses specified by CDB and commands executed by CDB.

FIG. 4 illustrates an exemplary records stored in the command record file 405 of the WORM device 400 according to one embodiment of the present invention. A column 410 indicates a serial number for each CDB or command. The serial number provides information as to the sequence of the commands. A column 420 indicates a command execution time or the time associated with the command. A column 430 includes a CDB stored in a hexadecimal format.

In this embodiment, the CDB are archived as it is sent by the host to eliminate performance costs resulting from extracting portions of the CDB and/or reformatting the CDB. Alternatively, the portions of the CDB may be extracted and reformatted or the entire CDB may be reformatted. Rows 440, 450, and 460 are examples of archived records in the command record file 405 on the WORM device 400.

Figure 6:
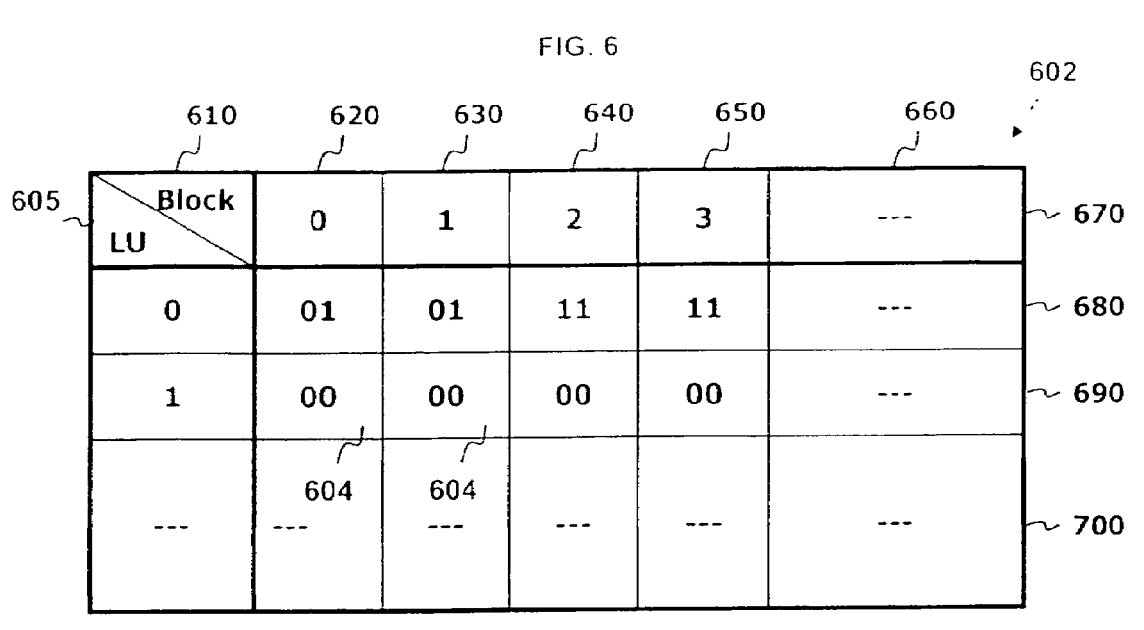

FIG. 6 illustrates a bitmap table 602 that the command checker module 500 uses to verify whether or not predetermined logical volumes have been maintained as WORM areas. A row 605 indicates LUNs. A column 610 indicates Logical Block Addresses of the logical volume. Columns 620, 630, 640, 650 and 660 refer to the Logical Block Addresses in a given logical volume. Rows 680, 690 and 700 are examples of LUNs. Each location 604 identified by a particular column and row refers to a given storage area or address in the storage system. Each location is provided with an entry of n bits of information that provides status information of the location.

In the present embodiment 2 bits of information is used. The upper bit indicates whether or not a WRITE command has been executed to the address. The lower bit indicates whether or not ERASE/FORMAT command has been executed to the address. Accordingly, the 2-bit information denote the following in the present embodiment:

"00": The address has neither been formatted nor written.
"01": The address has been formatted but not written.
"11": The address has been formatted and written.
"10": The address has not been formatted but has been written.

In the present embodiment, "10" does not provide any meaningful information. However, it may be provide meaningful information in another embodiment, e.g., in a situation where the command filter function is activated after the LUN has been formatted.

Figure 5:
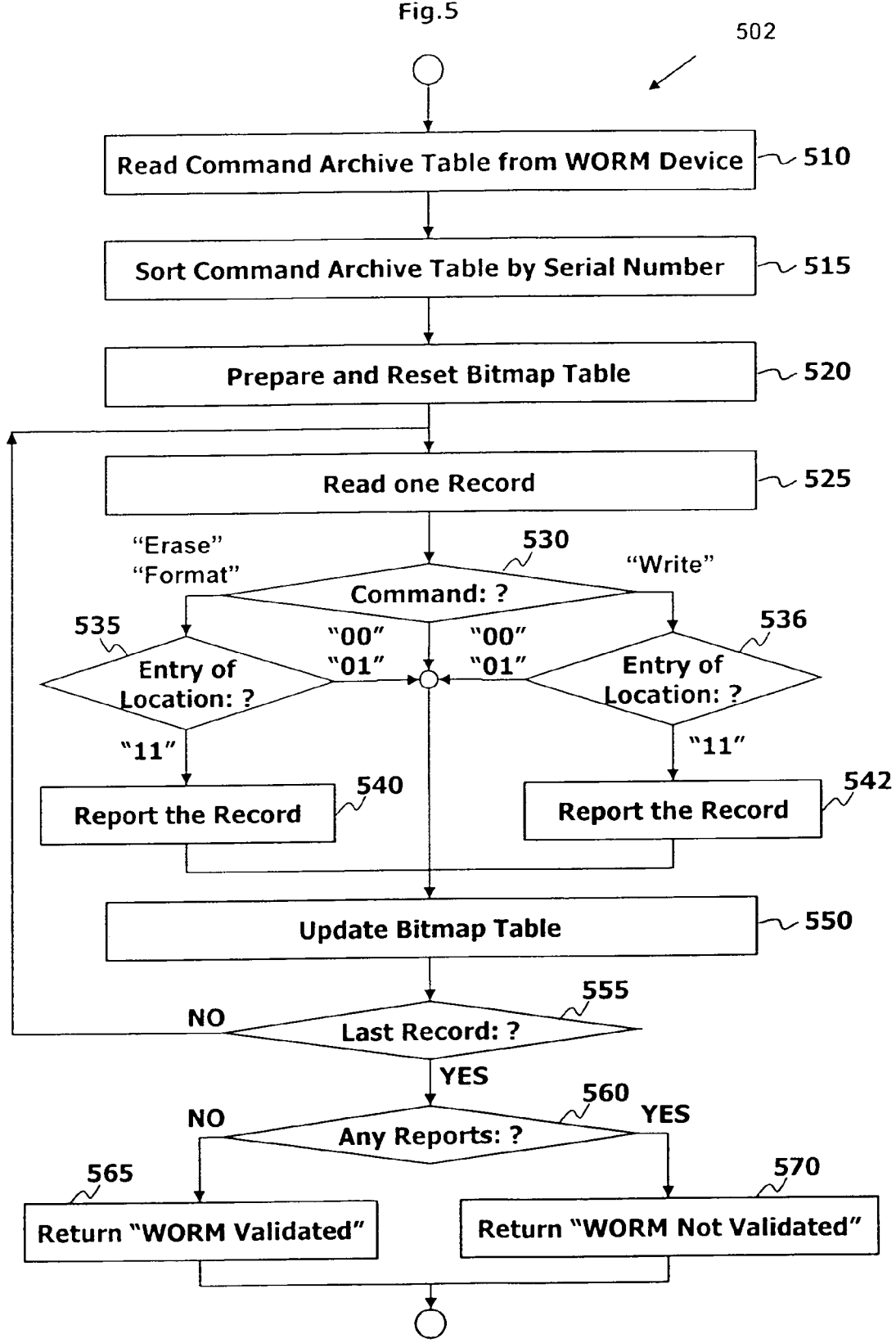
FIG. 5 illustrates a process performed by the command checker module to determine WORM integrity of the storage system according to one embodiment of the present invention.

FIG. 5 illustrates a process 502 performed by the command checker module 500 to determine WORM integrity of the storage system according to one embodiment of the present invention. At step 510, the module reads the command record file 405 from the WORM device 400. The module sorts the records in the command record file 405 according to the serial number 410 associated with each record (step 515). The sorting ensures that the commands are being reviewed in right order, so that the auditor would have better idea as to the sequence of events. In one embodiment, the serial number 410 is a command sequence number attached by the host prior to sending the commands to the storage system. In another embodiment, the serial number 410 is a command sequence number attached to the commands by the storage system to indicate the order of receipt of the commands. In yet another embodiment, the serial number 410 is a number that is attached only to the commands that are filtered/recorded on the WORM device 400 in order to indicate the order of relevant commands.

The module prepares and resets the bitmap table 602 of FIG. 6, so that all entries in the table are set to "00" (step 520). The module reads a record from the command record file 405 (step 525). The module extracts a relevant portion of the command (step 530). In the present embodiment, the operation code 221 of the CDB is extracted. If the command relates to FORMAT or ERASE, the process 502 proceeds to step 535. If the command relates to WRITE, the process proceeds to step 536. Otherwise, the process proceeds to step 550. In the present embodiment, the commands involving FORMAT, ERASE, or WRITE have been predetermined as filter candidates. However, additional types of commands may be added for filtering.

At step 535, the module extracts address information from the command, so that the storage area or location to which the command is directed may be determined. The extracted address information is LUN 222 and Logical Block Address 223 from the command. Once this information has been extracted, the module checks the entry for the identified location in the bitmap table 602. If the entry is "11," then the process proceeds to step 540. Otherwise (the entry is "00" or "01"), the process proceeds to step 550. The entry of "11" indicates that the command in question has committed a WORM violation by formatting or erasing the location when the location had stored data. The entries of "00" or "01" indicates that the command did not commit a WORM violation. That is, the location did not have stored data when it was formatted or erased.

At step 536, the module extracts address information from the command, so that the storage area or location to which the command is directed may be determined, as in step 535. The extracted address information is LUN 222 and Logical Block Address 223 from the command. The module checks the entry for the identified location. If the entry is "11," then the process 502 proceeds to step 542. Otherwise (the entry is "00" or "01"), the process proceeds to step 550. The entry of "11" indicates that the command has committed a WORM violation by writing to the location when the location had stored data, i.e., REWRITE has been performed to the location. The entry of "00" or "01" indicates a WORM violation has not been committed. That is, the WRITE command to the location was executed while the location was not storing any data.

In another embodiment, a physical address is identified by using a configuration table or by analyzing configuration commands stored in the same WORM device. It is necessary to identify the real address that must be proved as WORM if capacity of physical address is bigger than the one of logical address and the LUN are reused in the present implementation.

At steps 540 and 542, the module reports the WORM violation to the auditor 100 and transmits the record involved in the WORM violation for further examination. The method of reporting may vary according to implementation. For example, the report may be provided in User Interface, File, Application Program Interface, and other formats. In one embodiment, the module merely reports that the WORM function for the storage system 10 could not be verified, e.g., by sending the following message to the auditor 100: "WORM not validated."

At step 550, the module updates the bitmap table 602. If the command is FORMAT or ERASE, the module sets TRUE (1) to the first bit of the entry of the identified location. If the command is WRITE, the module sets TRUE (1) to the second bit of the entry.

At step 555, if the current record is the last record, then the process proceeds to step 560. Otherwise, the process returns to step 525 to retrieve next record from the command record file 405.

At step 560, the module checks if any WORM violation report has been issued at step 540 or 542. If so, the module transmits "WORM validated" message to the auditor (step 565), indicating that the storage system 10 has not performed any improper FORMAT, ERASE, or WRITE command in violation of WORM function. If not, the module transmits "WORM not validated" message to the auditor (step 570), indicating that the storage system 10 has performed at least one improper FORMAT, ERASE, or WRITE command.

In another embodiment, subsystem configuration commands that may be saved in the WORM device are also examined. If the module detects WORM violation commands, such as LUN size expansion, which may cause deletion of data stored in the LUN, the module reports that the LUN is "WORM not validated."

The present invention has been described in terms of specific embodiments. The description above of the specific embodiments are provided for illustrative purposes. The embodiments above may be modified, altered, or changed without departing from the scope of the present invention. Accordingly, the appended claims should be used to interpret the scope of the invention.

What is claimed is:

1. A storage system coupled to a host computer, the storage system comprising:
   a storage controller that conducts I/O operations based on commands received from the host computer; and
   a plurality of storage areas defined by at least one disk drive;
   wherein the storage controller filters selected types of commands from the received commands targeted to at least one of the plurality of storage areas when the at least one storage area is defined as a WORM area and stores at least a portion of received command on a WORM storage device to be coupled to the storage system if the received command is one of selected types of commands,
   wherein the WORM storage device is used to verify a function of the WORM area,
   wherein the storage controller associates a serial number to the received command and stores the serial number in the WORM device.

2. The storage system of claim 1, wherein the selected types of commands include at least a command relating to WRITE operation.

3. The storage system of claim 1, wherein the selected types of commands include at least commands relating to ERASE, FORMAT, and WRITE operations.

4. The storage system of claim 3, wherein the command is a Command Descriptor Block.

5. The storage system of claim 1, wherein the plurality of storage areas are a plurality of logical units.

6. A storage system coupled to a host computer, the storage system comprising:
   a storage controller that conducts I/O operations based on commands received from the host computer; and
   a plurality of storage areas defined by at least one disk drive;

wherein the storage controller filters selected types of commands from the received commands targeted to at least one of the plurality of storage areas when the at least one storage area is defined as a WORM area and stores at least a portion of received command on a WORM storage device to be coupled to the storage system if the received command is one of selected types of commands, wherein the WORM storage device is used to verify a function of the WORM area, wherein the storage controller associates a timestamp to the received command and stores the timestamp in the WORM device.

7. The storage system of claim 6, wherein the selected types of commands include at least a command relating to WRITE operation.

8. The storage system of claim 6, wherein the selected types of commands include at least commands relating to ERASE, FORMAT, and WRITE operations.

9. The storage system of claim 8, wherein the command is a Command Descriptor Block.

10. The storage system of claim 6, wherein the plurality of storage areas are a plurality of logical units.

* * * * *